S. P. M. TASKER.
COUPLINGS FOR TUBES.

No. 176,707. Patented April 25, 1876.

UNITED STATES PATENT OFFICE.

STEPHEN P. M. TASKER, OF PHILADELPHIA, PENNSYLVANIA.

IMPROVEMENT IN COUPLINGS FOR TUBES.

Specification forming part of Letters Patent No. 176,707, dated April 25, 1876; application filed January 20, 1876.

*To all whom it may concern:*

Be it known that I, STEPHEN P. M. TASKER, of the city and county of Philadelphia, in the State of Pennsylvania, have invented a new and useful Improvement in Couplings for Tubes, which improvement is fully set forth in the following specification, reference being had to the accompanying drawings.

My invention consists of tubes having flared or conical ends, in combination with collars, which fit thereon, and an internal ring of double conical form, which fits the internal surfaces of two contiguous flared ends of tubes, the whole being drawn together by means of screw-bolts or other suitable device. The conical ring is jointed in the middle of its length, for convenience in putting the tubes together. The flared surfaces are trued, and when drawn together by being of wedge form a very tight and strong joint is obtained, and additional tightness may be given to the joint by means of lead, hemp, or other packing.

The double conical ring for the convenience of taking the tubes apart is made in two pieces, jointed in the middle by male and female V edges; or the edges may be of circular or other form, which may have any suitable packing to give increased tightness thereto.

Figure 1:
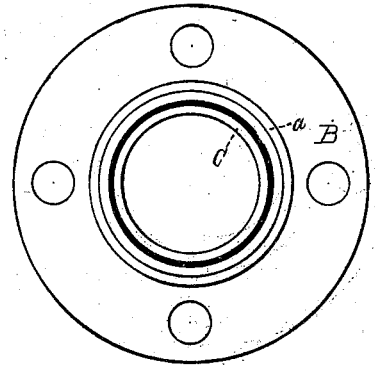
Figure 2:
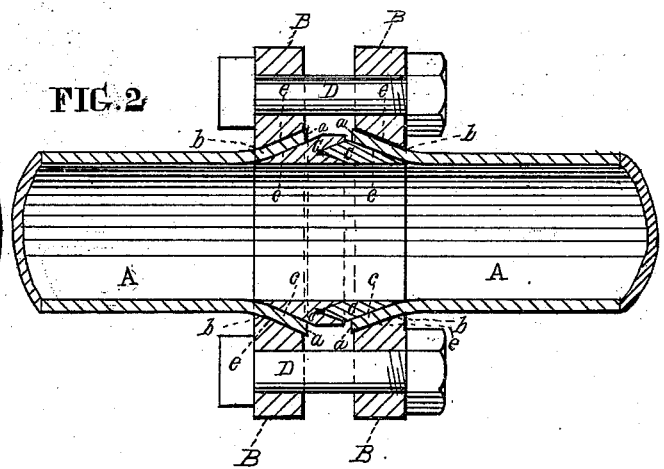

In the accompanying drawings, Figure 1 is an end view of one of the tubes A, having in connection one-half of the divided conical ring C and a clamping-collar, B. Fig. 2 is a longitudinal section of two tubes, in combination with the clamping-collars B B and the internal double conical ring C, held together by means of bolts D.

Like letters of reference in all the figures indicate the same parts.

A A are two tubes having flared or conical ends $a$, with outer surfaces $b$ and inner surfaces $c$. B B are collars, having bevel or conical edges $e$, which fit said external surfaces $b$. C is an internal double conical ring, whose conical surfaces $d$ fit the inner conical surfaces $c$ of the flared ends $a$ of the tubes. The ring is separated in the middle, and connected by means of a V-joint, to give increased tightness. The object of separating the ring is to make it more convenient to put the tubes together. Instead of the joint being made of V form, it may be made of circular or other form. The surfaces are turned true, so as to make a good fit, and the clamping-rings are drawn toward each other by means of the bolts D, or other suitable device, whereby a very tight and stiff joint is made. To increase the tightness, lead or other packing may be used between the bearing-surfaces.

I claim as my invention—

The double conical ring C, jointed in the middle of its length, as described, in combination with the flared ends of the tubes A, clamping-collars B, and screw-bolts D, substantially as and for the purpose set forth.

STEPHEN P. M. TASKER.

Witnesses:
 THOMAS J. BEWLEY,
 STEPHEN USTICK.